United States Patent Office 3,799,954
Patented Mar. 26, 1974

3,799,954
URETHANES FOR THE TREATMENT OF RUBBER
Maurice Edward Cain, Welwyn Garden City, Geoffrey Thomas Knight, Shefford, and Keith Frederick Gazeley and Peter McHugh Lewis, Hitchin, England, assignors to The Natural Rubber Producers' Research Association, London, England
No Drawing. Original application Nov. 16, 1970, Ser. No. 90,138, now Patent No. 3,721,659. Divided and this application Sept. 7, 1972, Ser. No. 287,027
Claims priority, application Great Britain, Nov. 28, 1969, 58,403/69
Int. Cl. C07c 125/06
U.S. Cl. 260—396 N  2 Claims

ABSTRACT OF THE DISCLOSURE

Novel urethanes having the formula $$X(NH.CO.O.N=Q=Z)_m$$

where X is an organic group of functionality $m$, Q is an aromatic group in the quinonoid configuration, Z is an imino group, and $m$ is an integer equal to 1 or more, may be made by reacting an organic isocyanate with a nitrosoaniline. The compounds are useful in the treatment of rubber.

---

This application is divided out of our copending application No. 90138 filed Nov. 16, 1970, now U.S. Pat. No. 3,721,659.

Our earlier copending application No. 752,174 filed Aug. 13, 1968, now abandoned, relates to a process for improving the resistance to degradation of unsaturated natural and synthetic rubbers and to the improved rubbery polymers prepared by the process. More particularly, our copending application is concerned with the formation of a rubber-bound antioxidant which is formed by the chemical reaction of an aromatic nitroso compound with the molecules of the rubbery polymer.

Our said copending application makes use of aromatic nitrosophenols and nitrosoanilines in which the nitroso group is directly attached to an aromatic ring, preferably in the para-position to the hydroxyl or amine group. Such compounds are not very pleasant to handle, and objections of possible toxicity and dermatitic activity have been raised against them. Also, they significantly reduce the scorch time of, and may peptise the rubber in, rubber mixes into which they are introduced. The present invention is an improvement in or modification of the basic invention of application No. 752,174 in which the necessity of handling the aromatic nitroso compounds as such in order to admix them with the rubber is avoided, and in which peptisation of the rubber and reduction in scorch time of the rubber mix is lessened.

The present invention provides compounds which are useful for improving the resistance to degradation of an unsaturated natural or synthetic rubber by providing antioxidant groups bound to the rubber molecules.

The treatment of rubber using these compounds is the subject of our U.S. patent application Ser. No. 90138 referred to above.

The compounds are useful for the treatment of both natural and synthetic polymers containing unsaturated carbon-carbon linkages, or other groups capable of suitable reaction with the aromatic nitroso compounds defined above, but are not suitable for use with rubbers normally regarded as saturated polymers which contain very low amounts of unsaturation for vulcanization purposes, for example, ethylene-propylene terpolymers and butyl rubber. Examples of suitable unsaturated synthetic rubbers are cis-polyisoprene, polybutadiene, styrene-butadiene copolymers, acrylonitrile-butadiene copolymers and polychloroprene. The treatment is applicable to unsaturated natural or synthetic rubbers both in the latex and in the dry form.

The present invention provides a urethane having the general formula $$X(NH.CO.O.N=Q=Z)_m$$

where

X is an organic group of functionality $m$,
Q is an aromatic group in the quinonoid configuration,
Z is an imino group, and
$m$ is an integer equal to 1 or more.

The nature of the group X is not critical to this invention. The group X may be regarded as the nonfunctional residue of the isocyanate starting material. The group X will generally be inert, and will often be an aliphatic, aromatic or aliphatic-aromatic group (of functionality $m$) containing carbon and hydrogen only.

It will be understood that the value of $m$ is equal to the functionality of the isocyanate used as a starting material.

Q is a phenylene or substituted phenylene group in the quinonoid configuration, preferably an unsubstituted p-phenylene group in the quinonoid configuration.

A convenient way of making these novel compounds is by heating the appropriate mono-C-nitrosoaniline with the appropriate organic isocyanate.

The aromatic nitroso compound which is one component of the urethane is preferably one in which the nitroso group is joined to the arylene group in the para-position to the —NHR group. The arylene group may be a phenylene or a substituted phenylene group, provided always that the nitroso compound is capable of forming a urethane with an organic isocyanate. The group R may be a $C_1$ to $C_6$ alkyl group or a phenyl group, or may be any other substituent, provided again that the nitroso compound is capable of forming a urethane with an organic isocyanate. Examples of suitable aromatic nitroso compounds are 4-nitrosodiphenylamine and N-hexyl-4-nitrosoaniline.

The nature of the organic isocyanate, which is the second component of the urethane, is not critical. It may be a mono-isocyanate, for example phenyl isocyanate, or a di- or polyisocyanate, for example toluene-2,4-di-isocyanate, 4,4'-di-isocyanatodicyclohexylmethane, or 4,4'-di-isocyanatodiphenylmethane.

The urethane may be prepared by conventional methods by warming the aromatic nitroso compound with the organic isocyanate, optionally in the presence of an inert solvent, for example to a temperature of from 50° C. to 110° C. for from 10 to 60 minutes.

Preferably substantially equivalent amounts of the two reactants are used, e.g. so as to provide from 0.8 to 1.2 isocyanate groups for reaction with each aromatic nitroso molecule. The course which is believed to be followed during the reaction may be represented as follows:

(a)  $R.HN—Ar—N=O \rightleftharpoons R.N=Q=NOH$ (b)  $m(R.N=Q=NOH) + X(N=C=O)_m$
     $\rightleftharpoons X(NH.CO.O.N=Q=NR)_m$ Reaction (a) in the scheme is the reversible formation of an oxime from the nitroso compound. The equilibrium of this reversible reaction, which is heavily on the left hand side of the equation under normal circumstances, is displaced to the right by removal of the oxime as it is formed through reaction (b). Reaction (b) takes place on warming the reactants together. In fact, reaction (b) is also reversible, since the urethanes decompose on being heated to their melting points to give the aromatic nitroso compound and free isocyanate; it is on this decomposition that the rubber treatment process of this invention depends.

Reaction (b) goes only with some difficulty and it may be necessary to use a relatively reactive organic isocyanate. We have found that aromatic isocyanates, and particularly aromatic di-isocyanates are more reactive in this reaction than aliphatic isocyanates. The use of catalysts may also be advantageous.

It will be noted that the reaction scheme requires the presence of at least one hydrogen atom attached to the amine nitrogen atom. We have found that the reaction does not work if unsubstituted nitrosoanilines are used, because substituted ureas are formed in preference to urethanes.

The compounds described above are not true urethanes, being the reaction products of isocyanate with =NOH, rather than with —COH. Their full chemical names are, however, complex, and they are referred to, for convenience, in this specification and claims as urethanes.

The amount of the urethane used in the treatment of rubber is preferably such as to provide from 0.2% to 3.0% by weight of the aromatic nitroso compound based on the weight of the rubbery polymer, more preferably 0.2% to 2.0% for latex compositions and 0.5% to 3.0% for dry rubber compositions.

In the case of latex compositions, the mixture of the rubber with the urethane may be formed by mixing solutions or ball-milled dispersions of the urethane prereaction product with the rubber latex, followed as desired by air-drying, coagulation, dipping or foaming by well known techniques.

In the case of dry rubber mixes, the urethane may be added to the rubber during normal compounding, care being taken that the temperature of the mixture does not rise to such an extent as to cause premature decomposition of the urethane.

It is believed that the urethane reversibly decomposes at an elevated temperature to give the aromatic nitroso compound which then reacts with the rubber, and an organic isocyanate. The temperature of decomposition of the urethane depends on its structure, but we have found that the desired reaction can generally be achieved by heating a dry rubber mixture at a temperature of from 100° C. to 250° C., preferably from 140° C. to 180° C., for from 1 to 60 minutes, higher temperatures requiring shorter heating times. It is believed that the aromatic nitroso compound reacts with the rubber substantially as fast as it is liberated. For latex, lower temperatures are generally appropriate, for example, from 60° C. to 130° C., preferably 90° C. to 120° C. It may even be possible to obtain the desired reaction by leaving the latex mixture at ambient temperatures for some days. It may be that the alkaline hydrolysis of the urethane in the latex enables the desired reaction to take place at lower temperatures than are possible with dry rubber compositions.

The urethanes can be used to protect raw or vulcanized rubber from oxidative degradation. Where the rubber is to be vulcanized, it is convenient to effect vulcanization using the same heating step. To this end, the heating step of the process of the present invention may be performed in the presence of such other fillers, additives, vulcanizing agents or other compounding ingredients as may be required for the final rubber product. While the urethanes of this invention can be used to protect unsaturated rubbers generally from oxidative degradation, it is preferable to select a urethane which decomposes in a temperature range appropriate to the rubber system to be protected.

It is believed that the reaction efficiency may be higher when a urethane is used than when the free nitroso compound is added direct to the rubber mix. Heating of the urethane-rubber mixture results in release of the nitroso compound which disappears, by reaction with the rubber, as fast as it is formed. It is thought that the presence, at any moment, of substantial quantities of free nitroso compound may reduce the reaction efficiency by initiating unwanted side reactions with intermediates.

If the urethane decomposes at too low a temperature, premature decomposition may take place, resulting in the presence in the rubber mix of substantial quantities of free nitroso compounds, which may reduce reaction efficiency and scorch time. If the urethane decomposes at too high a temperature, lengthy heating of the rubber mix may result in over-vulcanization.

The only really satisfactory way of determining the decomposition temperature of a particular urethane under conditions where the nitroso compound is removed as it is formed, is to test the urethane in a rubber mix. It does, however, appear that the decomposition temperatures of these urethanes are roughly proportional to their melting points. It further appears that the melting points of urethanes formed by reacting the same nitroso compound with different isocyanates, depend on the reactivity of the isocyanate, being higher for more active (e.g. aromatic) isocyanates.

In the examples, which are included to illustrate the various aspects of the invention, the following abbreviations have been used:

Nitroso compounds:
NDPA=4-nitrosodiphenylamine
HNA=N-hexyl-4-nitrosoaniline
Isocyanate:
MDI=4,4'-di-isocyanatodiphenylmethane Parts and percentages are by weight throughout, and temperatures are in ° C.

The general method of preparation is as follows:
The mono-isocyanate or di-isocyanate is dissolved in sodium dry toluene (250 ml.) in a 500 ml. flask fitted with magnetic stirrer, nitrogen inlet and a reflux condenser protected by a calcium chloride drying tube. The solvent is flushed with nitrogen before addition of the isocyanate, the nitrogen inlet being well below the surface of the liquid, and a gentle nitrogen stream is maintained through the apparatus. The nitrosoamine is added and the mixture heated with stirring until solution is complete.

EXAMPLE 1

Phenyl isocyanate (25 mmoles) was dissolved in sodium dry toluene as above, and NDPA (23 mmoles) added. The mixture was heated to reflux in the toluene for 1 hour, the bath turned off and the flask allowed to cool overnight to room temperature. The black tarry solid was removed by filtration, and the filtrate cooled to −70° C., when a brown solid separated. This was removed by filtration, washed with cold toluene, and dried under vacuum. The yield 15%, M.P. 100–110° (dec.).

EXAMPLE 2

NDPA (0.1 mole) and MDI (0.05 mole) were dissolved in sodium dry toluene (250 ml.) under nitrogen as above and the solution heated in an oil bath at 100–105° C. for one hour. The flask was allowed to cool to room temperature, the brown solid removed by filtration, washed with toluene and dried under vacuum. It had M.P. 160–162° (dec.), the yield was 80%.

EXAMPLE 3

A solution of N-hexyl-4-nitrosoaniline (50 mmoles) and MDI (25 mmoles) in sodium dry toluene (150 ml.) was prepared as above and triethylenediamine (4 mole percent on HNA) added as catalyst. The solution was heated in an oil bath at 60° C. for 25 minutes, allowed to cool to room temperature and the green precipitate removed by filtration, washed with toluene and dried under vacuum. The yield was 80%, M.P. 124° (dec.).

Identification of the derivatives

The absence of isocyanate groups was confirmed by the absence of the —NCO band at 2260 cm.$^{-1}$ in the infrared spectra. The urethane carbonyl band was present in all cases at 1720–1780 cm.$^{-1}$, whereas the corresponding urea derivatives of the nitrosoanilines (reaction at the NH group) would have a typical band at 1660 cm.$^{-1}$, and this was absent.

We claim:
1. A urethane having the general formula

$$X(NH.CO.O.N=Q=Z)_m$$

where
X is a hydrocarbon group,
Q is a phenylene group in quinonoid configuration,
Z is an imino group of formula NR wherein R is alkyl of 1–6 carbon atoms or phenyl, and
m is an integer equal to 1 or 2.

2. A urethane as claimed in claim 1, wherein Q is a p-phenylene group in the quinonoid configuration.

References Cited
UNITED STATES PATENTS 3,352,750  11/1967  Buntin _____ 260—396 N
3,645,980  2/1972   Baker et al. _____ 260—396 N VIVIAN GARNER, Primary Examiner U.S. Cl. X.R.

260—83.3, 85.1, 92.3, 94.7 A